April 8, 1930. J. P. POLSTER 1,753,475
ROTARY PIVOTED HAMMER
Filed Aug. 5, 1929
Fig.1.
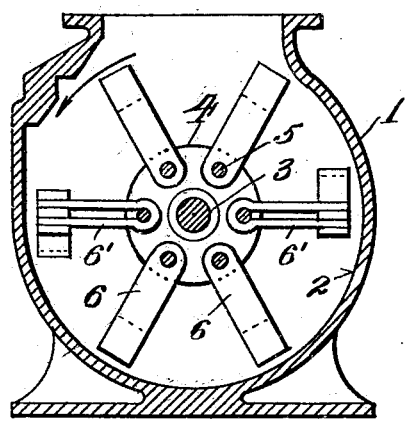
Fig.3.
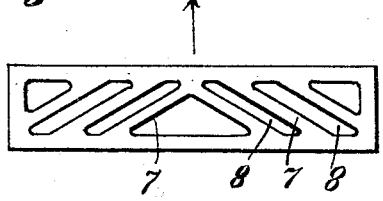
Fig.5.
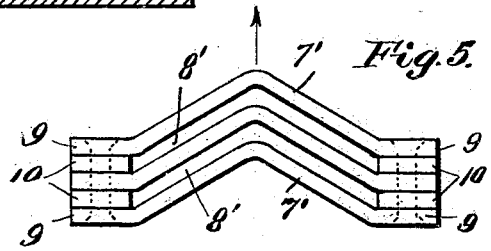
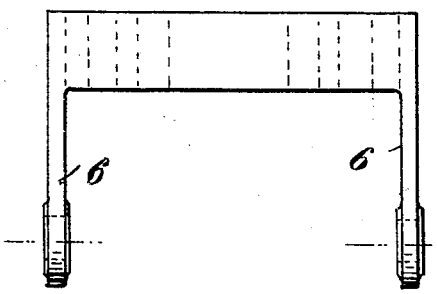
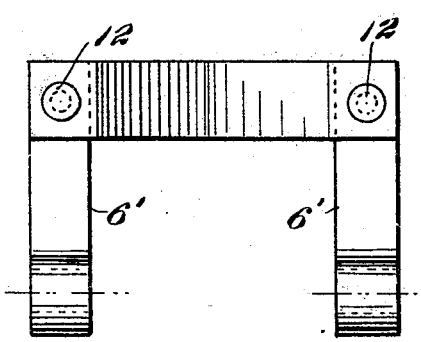
Fig.2.
Fig.4.
INVENTOR
BY John P. Polster,
H. M. Phisted,
ATTORNEY.

Patented Apr. 8, 1930

1,753,475

UNITED STATES PATENT OFFICE

JOHN P. POLSTER, OF ALTON, ILLINOIS, ASSIGNOR TO ILLINOIS STOKER COMPANY, OF ALTON, ILLINOIS, A CORPORATION OF ILLINOIS

ROTARY PIVOTED HAMMER

Application filed August 5, 1929. Serial No. 383,490.

This invention relates to certain new and useful improvements in rotary pivoted hammers, the peculiarities of which will be hereinafter fully described and claimed.

The main object of my invention is to provide a rotary pivoted hammer for crushers having an arcuate surface adapted to cooperate with the cutting edges on the outer face of the head of such a hammer, said cutting edges being so arranged and inclined to the direction of rotation as to effect a shearing action on the material being reduced, and said cutting edges being alternately arranged with a set of interposed spaces between said cutting edges on the bars formed by and spaced apart by said passages which are adapted to allow an outward flow of the rotating material therethrough to the cutting edges on the outer face of the head formed by said bars; and secondly, to spread the feed material across the face of the hammers and grinding surface.

This application is a continuation in part of my prior application on rotary pivoted hammers Ser. No. 261,471, filed March 14, 1928. In said prior application the bars of the head are spaced apart by alternate passages which are parallel to each other and at right angles to the direction of rotation.

In the present application the bars are inclined to the direction of rotation to effect a transverse shearing action upon the material being reduced.

In the accompanying drawing on which like reference numerals indicate corresponding parts, Fig. 1 represents a crushing pulverizer in sectional elevation embodying my invention;

Fig. 2, an enlarged detail face view of my shearing hammer as a casting;

Fig. 3, a top plan view of same;

Fig. 4, a view similar to Fig. 2 of a built-up steel bar construction; and

Fig. 5, a top plan view of Fig. 4.

In said prior application the outward flow of material through passages in the bar head alternating with the bars, was fully described.

In the present application the same outward flow of material takes place and an improved shearing action is effected by the construction now to be described.

Referring to the drawing, the numeral 1 designates a suitable casing having an arcuate grinding surface 2 preferably closed to form a non-perforate grinding surface, but may be otherwise.

In said casing is mounted a shaft 3 having discs 4 and rods 5, or other means for operatively mounting on said shaft a series of hammers. These hammers are preferably of the "stirrup" form having two shanks 6 provided with holes at their inner ends for said rods 5, and connected at their outer ends by a bar head. This head is made up of flat bars 7 spaced apart by substantially radial passages 8 alternating with the bars, and circumferentially inclined to the direction of rotation as indicated by the arrow 1. The bars are provided on their extreme outer face with cutting edges and are adapted to be mounted so as to rotate in either direction.

In the hammer shown as a casting in Figs. 2 and 3, the bars are inclined forward from each shank end of the head towards the center and when mounted to rotate in the direction of the arrow (Fig. 3) will tend to spread the entering coal or other feed material which has a tendency to collect in the center rather than at the sides of the casing. When the hammer is reversely mounted, the bars tend to center the material. In either case in cooperation with the arcuate grinding surface of the casing, these inclined bars have a transverse shearing action on the material.

In Figs. 4 and 5 the bars 7' are bent laterally in the center between the ends 9 which are spaced apart by the ends 10 of a U-shaped bar shank 6' the inner end of which forms a loop-eye for pivotal mounting on the hammer rod, as shown in Fig. 1. The bars 7' and the ends 10 of the shank 6' are fastened together by rivets 12 (Fig. 4) or otherwise. The ends 10 of the said shanks locate the passages 8' adjacent in the built-up head. These two forms of bars may be combined in one machine as shown in Fig. 1, or otherwise arranged as desired, according to the kind of material being ground, and its tendency to collect in the center of the casing, or vice versa.

The parallel circumferential arrangement of these spaced bars with their cutting edges provides a simultaneous shearing action on the material flowing outward to said cutting edges under centrifugal tendency of rotation. Thus each bar tends to reduce primarily the material flowing through the passage ahead of it, and the bars in the same head and positioned behind each other provide a successive shearing action on the several streams of material flowing through said passages outward towards the arcuate grinding surface, with which the cutting edges cooperate in reduction of the material.

The inclined arrangement of the bars and passages produces a secondary axial motion and shearing action as the material flows through said inclined passages to the cutting edges on the outer face of the bars. That is to say, the material also slides backward in said inclined passages and spreads out along the outer shearing edges, thus facilitating reduction.

When the bars are mounted so that they incline from the front center backward with respect to the direction of rotation the material tends to spread out towards the shanks of the hammers and sides of the casing. When the hammers are reversely mounted so that the bars and passages incline forward from the center to the ends of the bar head, the feed is directed towards the central plane between the sides of the casing when one cylindrical row of hammers is used; or is directed to the center of each bar head whether one row or more is used.

While I have shown the bars and alternating passages inclined in opposite directions in the bar head, they may be otherwise formed in the same or adjacent head, and inclined at different degrees from that shown, to provide the shearing and spreading action on the material as above described.

Thus any feed material having a tendency to collect either in the center or at the sides of the casing is readily spread by mounting the hammers as above described.

I claim:

1. A rotary pivoted hammer comprising a bar head having substantially radial openings therethrough,—said openings being inclined across the head and forming herring-bone bars.

2. A rotary pivoted hammer comprising a bar head having substantially radial openings therethrough,—said openings being inclined across the head and forming herring-bone bars inclined to the direction of rotation and adapted for simultaneous shearing action.

3. A rotary pivoted hammer comprising a bar head having substantially radial openings therethrough,—said openings being inclined across the outer face of the head from the ends of the head towards the center forming oppositely inclined herring-bone bars with shearing edges oppositely disposed, substantially as described.

4. In a crusher of the class described, the combination with a casing provided with an arcuate grinding surface, and a rotary shaft mounted in said casing, of pivoted hammers operatively mounted on said shaft and having a head provided with substantially radial openings therethrough alternating with bars having cutting edges adapted to cooperate with said arcuate grinding surface,—said cutting edges being inclined across the head and to the direction of rotation affording shearing action on the material passing outward through said passages under centrifugal action of rotation.

5. In a crusher the combination with a casing provided with an arcuate grinding surface, and a rotary shaft mounted in said casing, of rotary pivoted hammers operatively mounted on said shaft and each having a head consisting of parallel bars alternating with substantially radial passages,—the outer edges of said bars having cutting edges adjacent to said grinding surface and inclined to the direction of rotation and adapted to cooperate with said arcuate grinding surface with a transversely shearing action, substantially as described.

6. In a crusher the combination with a casing provided with an arcuate grinding surface, and a rotary shaft mounted in said casing, of a series of pivoted hammers operatively mounted on said shaft and having multiple-bar heads with alternating substantially radial passages and inclined to the direction of rotation,—some of said bars being inclined from the front face backward in the direction of rotation for spreading the feed material, and other hammers having their bars reversely inclined for centering the material, substantially as described.

In testimony whereof I have affixed my signature.

JOHN P. POLSTER.